United States Patent [19]

Leighton

[11] Patent Number: 5,044,204

[45] Date of Patent: Sep. 3, 1991

[54] DEVICE WITH STRAIN GAGED THREADED PORTION

[75] Inventor: George A. Leighton, Carver, Mass.

[73] Assignee: Teledyne Industries, Inc., Los Angeles, Calif.

[21] Appl. No.: 550,113

[22] Filed: Jul. 9, 1990

[51] Int. Cl.⁵ ............................................. F16B 31/02
[52] U.S. Cl. ........................................ 73/761; 29/761
[58] Field of Search ................ 73/761, 862.48, 862.49, 73/862.54, 862.65, 862.66, 767, 775; 29/595

[56] References Cited

U.S. PATENT DOCUMENTS 4,882,937 11/1989 Leon ..................................... 73/767

Primary Examiner—Jerry W. Myracle

[57] ABSTRACT

A device in which tension or compression axially of a threaded portion can be measured without thread deformation has threads with a material adhering to and filling an area of the threads, and strain gages adhered to the filling material.

8 Claims, 1 Drawing Sheet

DEVICE WITH STRAIN GAGED THREADED PORTION

FIELD OF THE INVENTION

This invention relates to devices, such as valves, which include an element, such as a valve stem, with strain-gaged threads.

BACKGROUND OF THE INVENTION

There has been a need to measure strain in an element having threads thereon, as for measuring axial tension or compression in valve stems in the nuclear industry.

SUMMARY OF THE INVENTION

I have discovered that strain may be measured in a thread-bearing element using the combination, with the threads thereof, of a material filling certain of the threads, and strain gages adhered to the filling material.

In a preferred embodiment the plastic is an epoxy, the threads are Acme, and the outer surface of the plastic lies in the same cylindrical surface as the outer periphery surfaces of the threads.

PREFERRED EMBODIMENT

We turn now to disclosure of a preferred embodiment of the invention, shown in the drawings and described in its structure and operation.

DRAWINGS

STRUCTURE

Figure 1:
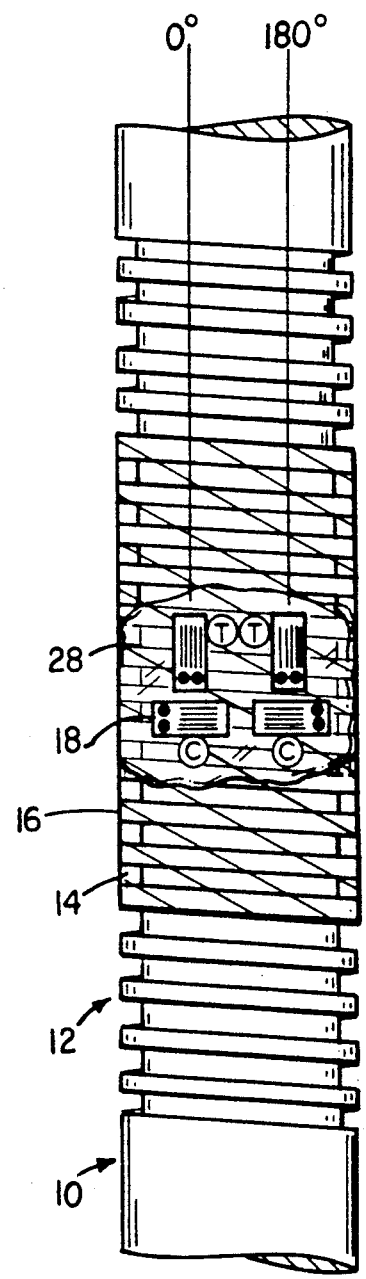
FIG. 1 is a somewhat diagrammatic side elevational view, broken away, of a valve stem of said embodiment.

The valve stem indicated generally at 10 carries the Acme-threaded portion indicated generally at 12, which in turn carries therearound cured epoxy band 14, the outer surface of which (although FIG. 1 is diagrammatic rather than literal on this point), together with the outer surface 16 of that portion of threaded portion 12 in contact with cured epoxy band 14, defines a cylinder.

Adhered to the epoxy band 14 are four strain gages 18, wired in the conventional way, with power lines 20, 22 and signal lines 24, 26. Although shown diagrammatically rather than literally in FIG. 1, the left-hand pair of strain gages shown are mounted on the epoxy band 14 on centers angularly spaced 180° around the band 14.

To make said embodiment, the threaded portion to carry band 14 is cleaned of matter such as paint, oxide, and scale abrasively, as with an abrasive cloth. The area is at least ten times the length and width of the strain gage area. Abrasion is to an 80 grit surface. This prepared area is then degreased with acetone.

The threads of band 14 are then filled with epoxy, preferably BLH EPY 500 (for service temperatures up to 500° F.) or Armstrong cement A-2 (for service temperatures up to 200° F.). A circumferential mold is applied to hold the epoxy in place, during cure, which follows.

Figure 2:
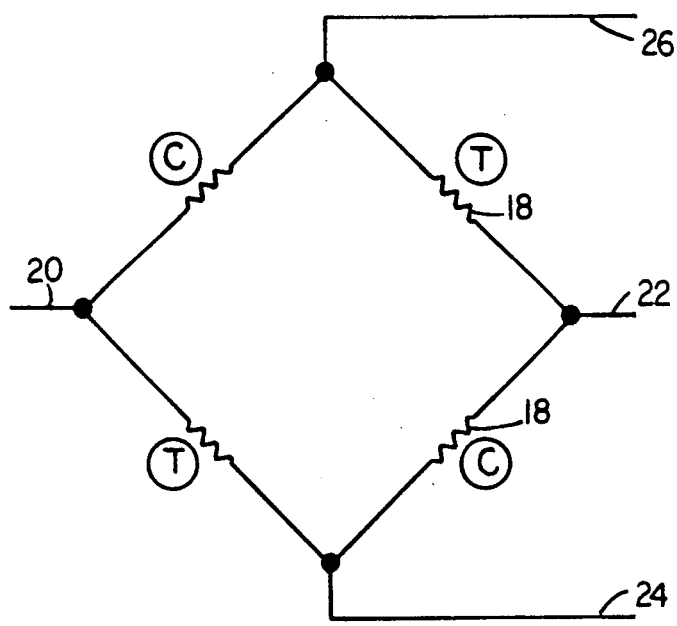
FIG. 2 is a wiring diagram illustrating the connections among the strain gages.

Band 14 is then abraded down to the diameter of the thread outside diameters to provide the aforementioned cylindrical surface. A layer of the epoxy being used is then applied to the outer surface of band 14 and the inner surfaces of the strain gages 18. The gages are then placed and clamped onto band 14, and a further curing cycle carried out. Electrical connections are then made as shown in FIG. 2, and the strain gage area coated with silicone moisture-proofing material 28.

OPERATION

My invention makes possible accurate measurement of
strain in a threaded portion without any change in the structure thereof.

OTHER EMBODIMENTS

Other embodiments of the invention will occur to those in the art.

For example, threads may be other than Acme. Other plastics may be used. Structural variations may be made.

What is claimed is:

1. A device comprising
   threads,
   a filled area in which said threads are filled by a filling material, and
   strain gages adhered to said filling material.

2. The device of claim 1 in which said device is a valve stem.

3. The device of claim 1 in which said filling material is a plastic.

4. The device of claim 3 in which said plastic is an epoxy.

5. The device of claim 4 in which said epoxy is BLH EPY 500.

6. The device of claim 4 in which said epoxy is Armstrong A-2.

7. The device of claim 1 in which said threads are external, and in which the outer diameters of said threads and said filling material are the same.

8. The method of making a strain gaged threaded device which comprises
   providing threads,
   cleaning at least a portion of said threads,
   filling at least an area of said threads with a filling material, and
   adhering strain gages to said filling material.

* * * * *